United States Patent [19]

Eversole

[11] Patent Number: 5,267,619
[45] Date of Patent: Dec. 7, 1993

[54] DISK HARROW ASSEMBLY
[75] Inventor: Brad K. Eversole, Bolingbrook, Ill.
[73] Assignee: Case Corporation, Racine, Wis.
[21] Appl. No.: 825,949
[22] Filed: Jan. 27, 1992
[51] Int. Cl.$^5$ ................................................. A01B 5/00
[52] U.S. Cl. ..................................... 172/572; 172/705
[58] Field of Search ............... 172/572, 570, 573, 500, 172/705, 707, 708, 711, 643; 384/157, 205, 192, 460; 267/36.1, 164

[56] References Cited

U.S. PATENT DOCUMENTS

| 3,640,348 | 2/1972 | Womble | 172/572 |
|---|---|---|---|
| 3,951,390 | 4/1976 | Krause et al. | 384/209 |
| 4,407,372 | 10/1983 | Rozeboom . | |
| 4,724,910 | 2/1988 | Wheeler | 172/572 |
| 5,042,590 | 8/1991 | Bierl James et al. | 172/572 |
| 5,207,279 | 5/1993 | Nelson et al. | 172/140 |

OTHER PUBLICATIONS

AMCO, "Wheel Offset Harrows", Jan. 1981.
AMCO Products Portable Elevator Division Dynamics Corporation of America two-page brochure (undated) showing disk harrows.

Primary Examiner—Randolph A. Reese
Assistant Examiner—Spencer Warnick
Attorney, Agent, or Firm—Rudnick & Wolfe

[57] ABSTRACT

A disk harrow assembly comprising a frame with an elongated beam and having an elongated shaft arranged generally parallel to and below the beam with a plurality of laterally spaced disks mounted on the shaft of rotation therewith. At least two laterally spaced bearing standards resiliently connecting the shaft to the beam. Each bearing standard includes a spring whose first extremity is secured to the beam, a curved central portion for positioning a free ended second extremity of the spring in spaced relation beneath the first extremity and a bearing assembly carried toward the free ended extremity of the spring for rotatably supporting the shaft. The bearing assembly is mounted toward the second end of the spring for rocking movement about an axis disposed in an acute angle relative to the horizontal direction of movement of the harrow assembly.

12 Claims, 2 Drawing Sheets

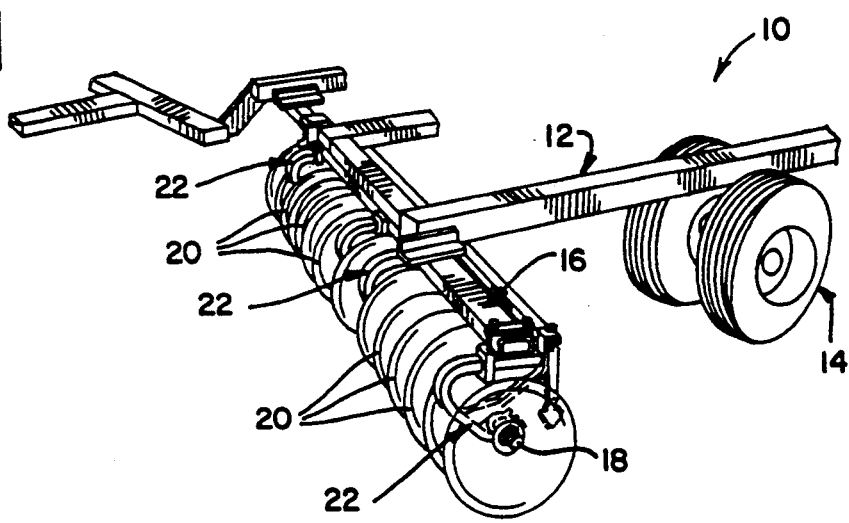
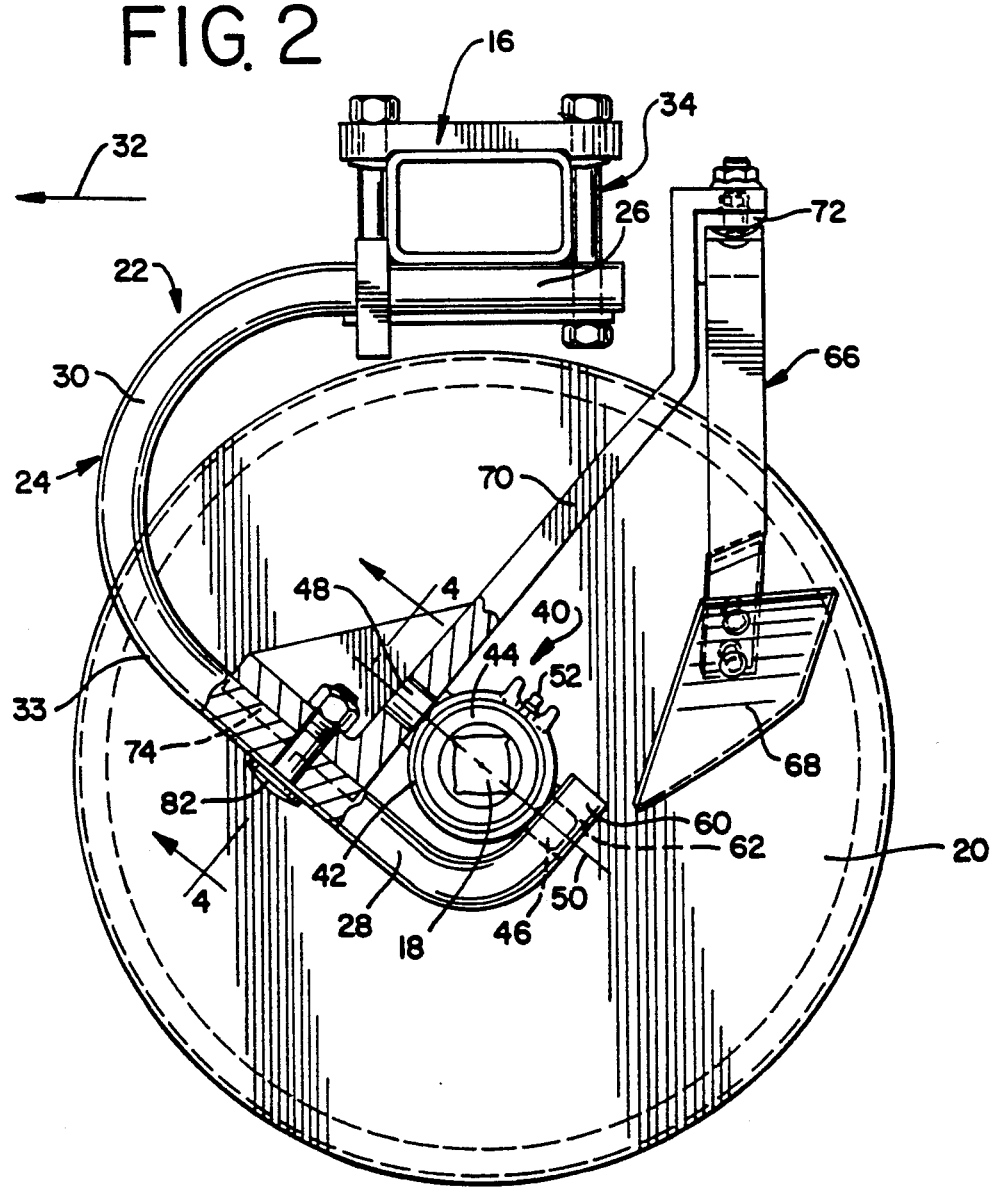

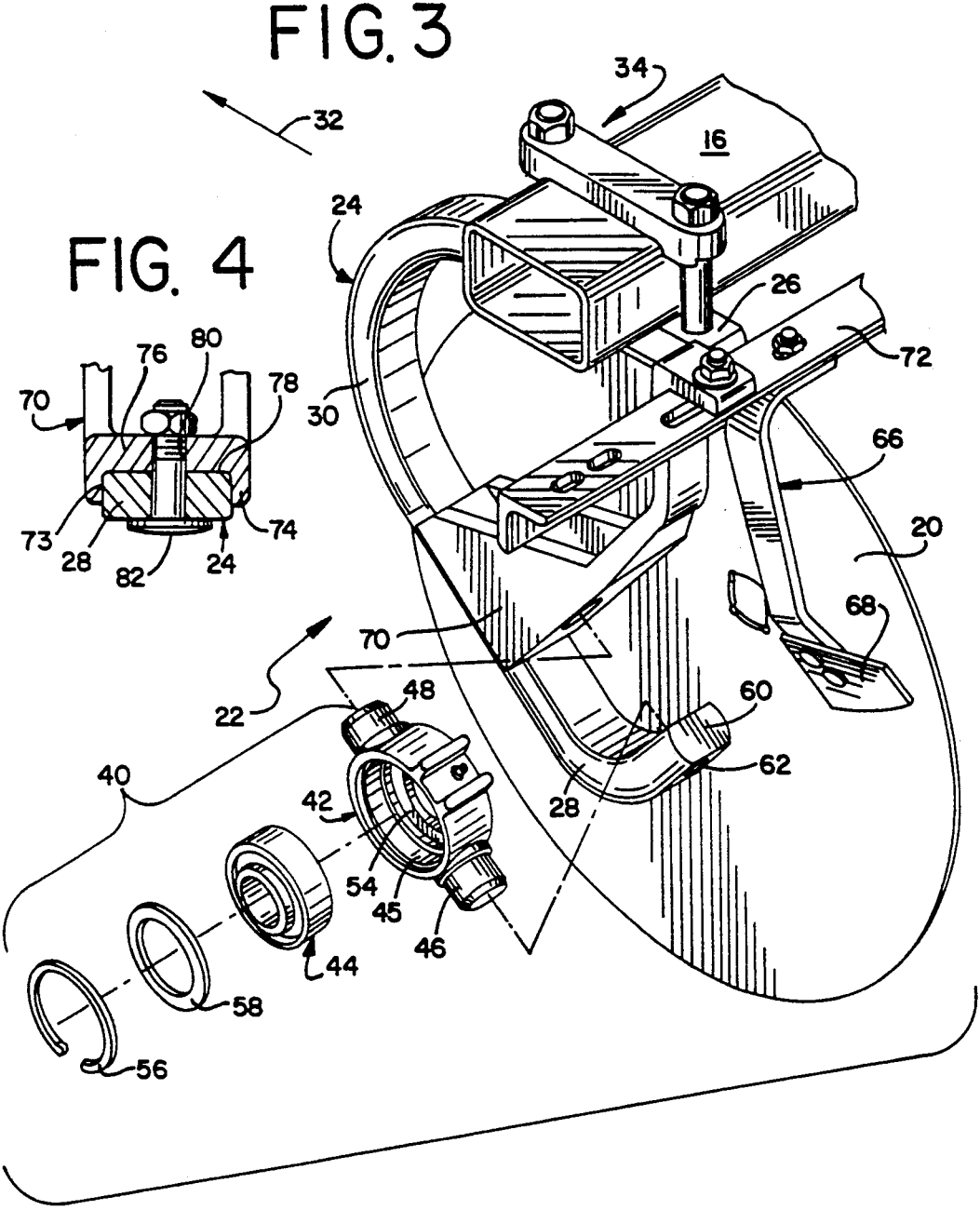

DISK HARROW ASSEMBLY

FIELD OF THE INVENTION

The present invention generally relates to farm implements and, more particularly, to a structure for resiliently mounting a gang of earth working tools on a draft frame.

BACKGROUND OF THE INVENTION

A conventional disk harrow assembly includes a draft frame mounted for rolling movement over a field and including an elongated beam. An elongated shaft having a plurality of earth working disks mounted for rotation therewith is rotatably supported by bearing standards to and beneath the beam. Each bearing standard includes a bearing for rotatably accommodating a lengthwise portion of the elongated shaft.

Some fields have stones, rocks, stumps, and/or other obstacles at or near the top surface of the field. Such obstacles cause impact loads to be applied to the bearings and disks. Therefore, it is desirable to provide a resilient mounting to cushion or reduce impact loads being imparted to the bearings and disks as the disk harrow assembly passes over such obstacles during a tilling operation.

One or more generally C-shaped springs have been used in the past to cushion impact loading of the bearings and disks. Such heretofore known springs have an upper leg portion which is secured to the elongated beam on the frame and a lower leg portion having the bearing mounted at a distal end thereof. The lower leg portion is joined to the upper leg portion by a curved center portion. Moreover, the lower leg portion extends generally parallel to the upper leg portion. The bearing, therefore, deflects generally perpendicular to the second leg portion along a generally vertical or straight up path as the disks pass over stones or other forms of obstacles as the implement is drawn across a field. With heretofore known bearing standard designs, the bearing is mounted such that it is allowed to misalign only about a generally horizontal axis.

Recent research has shown that as the disks pass over an obstacle in the field, the disk tend to deflect both rearwardly and upwardly rather than straight up and down. The bearings on heretofore known bearing standards, however, are not allowed to deflect or misalign in response to both rearward and upward forces being applied thereto. Accordingly, the angularly directed impact load applied against the bearing tends to cause the bearing to bind or seize thus reducing its life expectancy. As will be appreciated, bearing failure is a problem which seriously impedes operation of the implement. Moreover, replacement of a worn or seized bearing is a time consuming and tedious process requiring extensive manual labor because of the number of individual parts comprising the disk harrow assembly.

Thus, there is a need and a desire for a disk harrow assembly including bearing standards for resiliently mounting a gang of disk harrows on a draft frame and such that impact loading caused through deflection of the disk harrows can be absorbed thus prolonging the useful life of the bearings and disks and thereby reducing costly downtime and repairs.

SUMMARY OF THE INVENTION

In view of the above, and in accordance with the present invention, there is provided a pair of bearing standards which resiliently mount a disk gang shaft to and below an elongated beam of a disk harrow assembly frame. Each bearing standard includes a spring having a first end which is fastened to the elongated beam of the disk harrow assembly frame. A central portion of the spring positions a free second end of the spring in vertically spaced relation beneath the first spring end. A bearing assembly is carried toward the second end of the spring for rotatably supporting a lengthwise portion of the disk gang shaft. The bearing assembly includes a bearing which is mounted for rocking movement about an axis extending at an acute angle to the horizontal direction of travel of the disk harrow frame assembly. The bearing mounting allows the bearing to deflect about an axis extending transverse to the direction of deflection of the spring thereby allowing bearing self alignment as the disks of the harrow assembly pass over an obstacle thereby reducing binding forces on the bearing during operation of the harrow assembly.

In a preferred form of the invention, the bearing of each bearing standard is mounted within a trunnion or bearing housing. Diametrically opposed trunnions extend outwardly from the bearing housing and define the axis about which the bearing deflects. Preferably, the axis about which the bearing housing deflects defines an included angle ranging between about 35° to about 50° with the horizontal direction of movement of the disk harrow assembly. In a most preferred form of the invention, the axis about which the bearing housing rocks defines an included angle of about 40° relative to the horizontal.

The bearing housing of each bearing standard is attached toward the free second end of the spring between opposed limbs of the spring to protect the bearing carried thereby against field debris from impacting thereagainst. In a preferred form of the invention, the free end of the spring is bent to accommodate one of the trunnions on the bearing housing. The overall configuration of the spring allows the outer surface thereof to form a ramp-like surface thereby forcing soil and residue smoothly under the standard assembly and gently lifting the gang of disks over larger obstacles in the field. The resulting force applied to the bearing from such displacement can easily be absorbed by the spring.

The disk harrow assembly further includes a scraper assembly including a series of scrapers positioned to remove dirt and debris from rotating disks and which is responsive to spring deflection thereby maintaining the relative position of scraper and disk substantially constant. The scraper assembly includes an upstruck mounting member which is attached toward the second end of the spring. Thus, each scraper moves in response to spring deflection. Moreover, the mounting member is configured to support one of the trunnions on the bearing housing.

A salient feature of the present invention concerns a bearing standard including a spring for resiliently mounting a bearing toward a free end of a spring limb for deflection about an axis forming an acute included angle with another spring limb. Such a bearing mounting allows the bearing to self align in response to spring deflection as the disks move over obstacles in the field. In contrast to previous designs which impart high impact loads when a large rock or obstacle strikes the bearing assembly head on, the spring configuration offered by the present invention gently lifts the gang assembly over such obstacles. Configuring the spring and the scraper support in the manner taught by the present invention further promotes a reduction in the number of parts required of the bearing standard. By mounting the scraper for movement in response to spring deflection, it promotes and generally maintains a proper working relationship between each scraper and each disk on the gang assembly.

Numerous other features and advantages of the present invention will become readily apparent from the following detailed description, the accompanying drawings, and the appended claims.

BRIEF DESCRIPTION OF THE DRAWINGS

FIG. 1 is a perspective view of a portion of a disk harrow assembly incorporating teachings of the present invention.

FIG. 2 is an enlarged side elevational view of a resilient mounting according to the present invention;

FIG. 3 is an exploded perspective view illustrating features of the present invention; and FIG. 4 is a sectional view taken along line 4—4 of FIG. 2.

DETAILED DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, in FIG. 1, there is illustrated a portion of a disk harrow assembly 10. Harrow assembly 10 includes a frame 12 which is adapted to be connected to and towed behind a tractor or the like (not shown) for movement across a field and which is supported by wheels 14. The harrow assembly frame 12 also includes a laterally elongated generally rectangular and hollow beam 16. An elongated gang shaft 18 is arranged generally parallel to and below the beam 16. As is conventional, the gang shaft 18 has a plurality of laterally spaced ground engaging or ground working disks 20 mounted thereon and which are rotatable with shaft 18.

A plurality of laterally spaced bearing standards 22 resiliently connect gang shaft 18 and the disks 20 to beam 16 of frame 12. Since each bearing standard 22 is of substantially identical construction, only one bearing standard will be described in detail with the understanding that the other bearing standards are of substantially similar construction.

As shown in FIGS. 2 and 3, each bearing standard 22 includes a curved leaf spring 24 comprised of diverging upper and lower limbs or extremities 26 and 28 which are joined to each other by a curved center section 30 which is closed in the direction of travel indicated by the arrow 32. Spring 24 is preferably fabricated from a very hard metal or metal alloy such as heat treated grade 51860H steel so as to provide a relatively hard wearing surface 33 along an outer surface thereof.

The upper limb 26 of spring 24 extends in a generally horizontal direction and is secured to the beam 16 by a suitable fastening mechanism 34 preferably including a bolt end bracket arrangement. Fastening mechanism 34 is described in further detail in U.S. Pat. No. 4,407,372 to H. Rozeboom, the full teachings of which are incorporated herein by reference. The curved center section 30 on spring 24 positions the free ended second limb 28 of spring 24 in spaced relation beneath the first extremity 26 and such that the first and second limbs 26 and 28, respectively, define an included and acute angle therebetween. Preferably, the included angle between limbs 26 and 28 ranges between about 35° to about 50°. In a most preferred form of the invention, the included angle measures about 40°.

Each bearing standard 22 further includes a bearing assembly 40 carried by spring 24 for rotatably supporting a lengthwise portion of the gang shaft 18. As shown, the bearing assembly 40 is carried by the second limb 28 of spring 24 beneath the first limb 26 to protect the component parts thereof from impacting with rocks, stumps, or other upstruck obstacles which could harm or impact with the bearing assembly.

Bearing assembly 40 preferably includes a bearing or trunnion housing 42 which captively carries a bearing 44 therewithin. Housing 42 defines a bearing receiving cavity 45 and includes a pair of diametrically opposed trunnions 46 and 48 which define an axis 50 about which housing 42 rocks in response to impact loadings being applied against the disks 20. As shown, axis 50 extends generally parallel to the second limb 28 of spring 24. Housing 42 further defines a suitable grease fitting 52 for supplying lubricant such as grease to the bearing 44 captively received within housing 42. A housing wall 54 (FIG. 3) inhibits bearing 44 from shifting in one sidewise or lateral direction. A releasable retainer 56 and washer 58 cooperate with housing 42 and inhibit bearing 44 from shifting in an opposite sidewise or lateral direction. Bearing 44 is preferably configured as a conventional ball or anti-friction bearing.

As shown in FIGS. 2 and 3, the free end of the second limb 28 of spring 24 is preferably formed with an upturned and apertured lip 60 extending normal to the second limb 28 and toward the first limb 26. The aperture 62 defined by lip 60 rotatably accommodates trunnion 46 of bearing housing 42 thereby providing a "built-in" support for the rear trunnion 46 of bearing housing 42.

To promote efficiency and operation, the disk harrow assembly 10 further includes a scraper assembly 66 including a series of scrapers 68 which are positioned to cooperate with and remove dirt and other debris from the disks 20 as the harrow assembly is drawn across the field. Scraper assembly 66 further includes a support 70 fastened to the spring 24 and a laterally elongated member 72.

Support 70 serves a dual purpose. First, support 70 acts to rotatably support trunnion 48 of bearing housing 42. By fabricating the support from a casting, extra thickness is added in the area of the trunnion support to increase the contact surface and thereby improving the wear life for the disk harrow assembly. Second, support 70 acts to position member 72 such that the scraper 68 can depend therefrom and be readily fastened thereto. Fabricating the support 70 from a casting allows a lateral offset to be "cast in" which allows the support 70 to be advantageously positioned relative to the cupped configuration of the disks 20 thereby allowing more clearance between the support 70 and disk 20 for improved material flow therebetween.

Notably, support 70 is fastened to the free-ended second limb 28 of spring 24. In a preferred form of the invention, and as shown in FIG. 4, a lower end of support 70 is somewhat channel shaped having a pair of laterally spaced apart side walls 73 and 74 depending from a top wall 76 for engaging the sides of spring 24 thereby resisting lateral movement of the support relative to the spring 24. The top wall 76 is disposed for overlying and engaging the inner surface 78 of spring 24 and is apertured as at 80 for receiving a bolt 82 for securing the support to the second limb 28 of spring 24.

During operation, and when the disks 20 of the harrow assembly 10 encounter an obstacle, spring 24 cushions or absorbs the impact loads imparted to the bearing assembly and disks 40. Mounting the bearing assembly 40 at an acute angle relative to the horizontal further allows the bearing assembly to self align about axis 50 which extends generally normal to the direction of spring deflection.

Mounting the bearing assembly 40 to an inner surface of spring 24 protects the bearing assembly 40 against impacting with rocks, stumps, and other obstacles in the field. Moreover, the diverging configuration between limbs 26 and 28 of spring 24 substantially eliminates any abrupt change in surfaces and allows the outer surface of the spring 24 to act as a ramp for forcing soil and residue smoothly under the standard assembly. As will be appreciated, when a large rock or obstacle is encountered, it will easily slide under the standard assembly, thus gently lifting the assembly up and over the obstacle. Moreover, fabricating the spring from a relatively hard steel provides an extremely hard surface along the outer surface 33 of the spring thereby creating an excellent wear guard which protects the more fragile parts, i.e., bearing housing 42 and bearing 44 from damage due to abrasive soils and/or rocks and other obstacles encountered in the field during operation.

In a preferred form of the invention, the free second end of spring 24 is provided with the upturned lip 60. This design eliminates the need for extra parts to support trunnion 46 of the bearing housing. Moreover, the upturned lip 60 also creates an extremely good contact surface for the bearing housing to pivot on due to the extra hard material from which the spring is fabricated, as well as the thickness of the material used for the spring.

Another advantage of the present invention is that the scraper assembly 66 is supported from the free ended second limb 28 of spring 24. Supporting the scraper assembly from the free ended second limb 28 allows the scraper 68 to move laterally with the bearing assembly 40 and the disks 20 rotatably supported thereby as they flex sidewise under field loading. Such an arrangement maintains substantially constant contact between the scrapers 68 and disks 20 thereby improving the scraping effect. Notably, the support 70 of the scraper assembly is clamped to the spring through use of a single bolt 82 in a manner inhibiting the support 70 from rotating about that bolt. This simplistic design maintains both the support 70 and trunnion housing 42 in place thereby allowing for fast, easy assembly and repair of the harrow assembly, as required.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A disk harrow assembly comprising a frame adapted to be towed for generally horizontal movement across a field and including an elongated beam, an elongated shaft arranged generally parallel to and below the beam with a plurality of laterally spaced disks mounted on and for rotation with said shaft, at least two laterally spaced bearing standards for resiliently connecting said shaft and beam, each bearing standard including a curved leaf spring having a first portion joined to a free ended second portion by a curved central portion, fasteners for fastening an extremity of said first portion of the spring to said beam, with the central portion of said spring positioning the second portion in spaced relation below and extending at an angle of about 35° to 50° relative to said first portion, and a bearing assembly carried by the second portion of said spring for rotatably supporting said shaft, said bearing assembly including a bearing adapted to have said shaft pass therethrough and which is captively received within a trunnion housing, the trunnion housing being mounted on the second portion of said spring for rocking movement about an axis extending generally parallel to the second portion of the spring whereby the bearing is permitted to self-align itself in response to upward and rearward disk deflection during harrow assembly operation.

2. The disk harrow assembly according to claim 1 wherein the central portion of said spring is configured such that the second portion of the spring to which the trunnion housing is mounted forms an angle of about 40° relative to the first portion of said spring.

3. The disk harrow assembly according to claim 1 wherein said trunnion housing is mounted to an interior surface of said spring on said second portion to protect the bearing carried thereby against field debris impacting thereagainst.

4. A disk harrow assembly comprising a frame adapted to be towed for generally horizontal movement across a field and including an elongated beam, an elongated shaft arranged generally parallel to and below the beam with a plurality of laterally spaced disks mounted on and for rotation with said shaft, at least two laterally spaced bearing standards for resiliently connecting said shaft and beam, each bearing standard including a curved leaf spring, fasteners for securing a first extremity of said leaf spring to said beam, said spring being configured with a curved central portion which positions a free ended second extremity of said spring in spaced relation beneath said first extremity and wherein the second extremity is offset at about a 40° angle relative to the first extremity, wit the offset angle therebetween allowing an outer surface of said spring to form a ramp like configuration to force soil and residue smoothly under a bearing assembly mounted toward the second extremity of said spring and adapted to rotatably support said shaft, said bearing assembly including a bearing having said shaft pass therethrough and which is captively received within a trunnion housing, the trunnion housing being mounted toward the second extremity of said spring for rocking movement about an axis extending transverse to the direction of deflection of said spring thereby allowing the bearing to self align in response to the disks impacting with obstacles during harrow assembly operation.

5. A disk harrow assembly according to claim 1 further including a scraper assembly including a series of scrapers positioned to remove dirt and debris from rotating discs of the harrow assembly and which are movable in response to spring deflection thereby maintaining the relative mounting position of the scrapers and disks substantially constant.

6. A disk harrow assembly comprising a frame adapted to be towed across a field and including an elongated beam, an elongated rotational member having a plurality of laterally spaced disks mounted for rotation with said member, a pair of spaced bearing standards for resiliently mounting said member to and below said beam, each bearing standard including a unitary spring having a first portion fastened to said beam and a free-ended second portion in spaced relation beneath said first portion, with said first and second portions being connected by a a central portion such that said first and second portions form an acute angle ranging between about 35° to about 50° therebetween, and a assembly mounted on the second portion of said spring for rotatably supporting said member, said bearing assembly being freely rotatable about an axis extending generally parallel to the second portion of the spring to reduce binding forces on the bearing assembly during operation of the harrow assembly.

7. The disk harrow assembly according to claim 6 further including an assembly for scraping dirt and debris from the rotating disks as the harrow assembly moves across a field.

8. A disk harrow assembly comprising a frame adapted to be towed for generally horizontal movement across a field and including an elongated horizontal beam, a horizontally elongated rotatable shaft arranged generally parallel to and below the beam, a plurality of spaced disks mounted on and for rotation with said shaft, at least two substantially identical spaced bearing standards for resiliently connecting said shaft and beam, each bearing standard including a curved spring having diverging upper and lower limbs joined by a curved central portion, fasteners for fastening said upper limb of said spring to said beam, a bearing assembly arranged in spaced relation beneath said upper limb of said spring for rotatably supporting said shaft, said bearing assembly including a bearing adapted to rotatably accommodate a lengthwise portion of said shaft, said bearing being captively accommodated in a bearing housing mounted toward a free end of said lower limb of said spring, said housing having diametrically opposed trunnions extending outwardly therefrom to define an axis about which said bearing housing and the bearing mounted therein rock, with said axis extending at an acute angle of about 35° to about 50° relative to the upper limb of said spring thus allowing the bearing to self align in response to impact loads applied against said disks.

9. The disk harrow assembly according to claim 8, wherein the free end of said lower spring limb has an upturned lip which is configured to rotatably accommodate one trunnion of said bearing housing.

10. The disk harrow assembly according to claim 8 further including a disk scraper assembly including an upstruck mounting member attached to the lower spring limb and which is configured to rotatably accommodate one trunnion of said bearing housing.

11. The disk harrow assembly according to claim 8 wherein said bearing housing further defines an apparatus for supplying lubricant to said bearing captively received within said housing.

12. An apparatus for resiliently mounting a gang of disk harrows to and below and elongated beam, said range of disk harrows being mounted on and for rotation with an elongated rotatable member, said resilient mounting apparatus comprises a spring having first and second generally straight limbs which are joined to and diverge from each other at an angle ranging between about 35° to about 50°, fasteners for releasably fastening an aft end of the first straight limb of said spring to said beam, said first and second limbs being joined by a central portion on said spring which positions the second straight limb in spaced relation beneath said first straight limbs, and a bearing assembly mounted toward a free second end of said second limbs for rotatably supporting said elongated member, said bearing assembly being mounted for rocking movement about an axis extending generally parallel to the second limb of said spring to permit the bearing assembly to self align itself when the disk harrows impact against an object during a harrow assembly operation.

* * * * *